United States Patent

[11] 3,626,013

| [72] | Inventors | Volker Jager<br>Brussels;<br>Heinz Gunter Viehe, Linkebeek, both of<br>Belgium |
|---|---|---|
| [21] | Appl. No. | 775,502 |
| [22] | Filed | Nov. 13, 1968 |
| [45] | Patented | Dec. 7, 1971 |
| [73] | Assignee | Union Carbide Corporation<br>New York, N.Y. |

[54] PROCESS FOR PRODUCING NITROACETYLENES
3 Claims, No Drawings

[52] U.S. Cl..................................................... 260/644,
260/247, 260/290 V, 260/293 R, 260/583 F,
260/609 A, 260/612 D, 260/614 R, 260/645
[51] Int. Cl..................................................... C07c 79/06
[50] Field of Search............................................ 260/644,
645, 614 R, 612 D, 290 V, 247, 583 H, 583 F, 583
M, 609 A, 293

[56] References Cited
UNITED STATES PATENTS

| 3,357,959 | 12/1967 | Jabloner...................... | 260/80 |
| 3,483,256 | 12/1969 | Delavarenne et al......... | 260/583 |

OTHER REFERENCES

Perekalin, Unsaturated Nitro Compounds pp. 85– 87, David Davey & Co., New York (1964).

*Primary Examiner*—Benjamin R. Padgett
*Assistant Examiner*—E. A. Miller
*Attorneys*—Paul A. Rose, Charles J. Metz and William R. Moran ABSTRACT: Nitroacetylenes are prepared by contacting a 1-nitro-2-haloethylene with a strong base in a heterogeneous reaction system. The nitroacetylenes are useful reaction intermediates, for instance, they can be reacted with dienes to produce useful compounds.

PROCESS FOR PRODUCING NITROACETYLENES

The invention relates to nitroacetylenes and to a process for producing them. In one aspect, the invention relates to nitroacetylenes as new compositions of matter. In another aspect, the invention relates to a process which comprises contacting a 1-nitro-2-haloethylene with a strong base in a heterogeneous reaction system.

The literature has erroneously reported the preparation of nitroacetylenes. Loevenich et al., Chem. Ber. 63, pp. 636 et seq. and 1707 et seq. (1930), report the preparation of nitroacetylenes via the following route:

R—CH  CBrNO$_2$ + HNR'$_2$  R—C  C—NO$_2$

The authors report no analyses other than an approximate nitrogen analysis of the dark, undistillable, residual oils that resulted from this reaction. It is certain that the authors did not produce nitro-acetylenes by the reported reaction for the following reasons:

1. The reported reaction was repeated. Infrared spectrum showed no triple bond.
2. Reactions of C$_6$H$_5$CHBr—CHBrNO$_2$ with triethylamine produced C$_6$H$_5$CH  CBrNO$_2$, but no further elimination could be obtained.
3. Treatment of C$_6$H$_5$CH  CBrNO$_2$ in the vapor phase with solid potassium hydroxide at 130° C./0.1 mm. led only to decomposition.
4. It has been found that nitroacetylenes react very rapidly with primary and secondary amines to give addition products. Therefore, the amines that the authors reported having used for HBr elimination would have reacted with any nitroacetylene that might have been formed.

In accordance with the present invention, nitroacetylenes are prepared by contacting a 1-nitro-2-haloethylene with a strong base in a heterogeneous reaction system. 1-Nitro-2-iodoethylenes are prepared by the following known reaction:

a. R—C  CH + N$_1$O$_4$ + I$_2$  RCI  CHNO$_2$

Ref. Stevens et al., J. Am. Chem. Soc. 80, 338 (1958)

1-Nitro-2-bromoethylenes can be prepared by the following route:

Reaction of a beta-bromoethylene with nitryl bromide (which can be generated in situ by interaction of N$_2$O$_4$ and BrCCl$_3$) to form a 1-nitro-2,2-dibromoethane:

b. R—CBr  CH$_2$+NO$_2$Br  RCBr$_2$—CH$_2$NO$_2$

Dehydrobromination of the product of reaction b with sodium acetate:

c. RCBr$_2$—CH$_2$NO$_2$  RCBr  CHNO$_2$

1-Nitro-2-chlorethylenes are prepared in an analogous manner:

d. R—CCl  CH$_2$ + NO$_2$Cl  RCCl$_2$—CH$_2$NO$_2$
e. RCCl$_2$—CH$_2$NO$_2$  RCCl  CHNO$_2$

Among the 1-nitro-2-haloethylenes that can be used in the invention are the following compounds, which can be prepared by the routes described above:

1-nitro-2-iodo-3,3--dimethylbutene,
1-nitro-2-iodo-3,3--dimethyl-1-pentene,
1-nitro-2-bromo-3,3--dimethylbutene,
1-nitro-2-chloro-3,3--dimethylbutene,
1-nitro-2-iodo-1-propene,
1-nitro-2-bromo-1-butene,
1-nitro-2-iodo-3-methyl-1-butene,
1-nitro-2-chloro-3-methyl-1-butene,
1-nitro-2-iodo-1-octene,
1-nitro-2-iodo-2-phenylethylene,
1-nitro-2-iodo-2-(N,N-dimethylamino)-ethylene,
1-nitro-2-iodo-2-(N-morpholino)-ethylene,
1-nitro-2-iodo-2-(2-pyridino)-ethylene,
1-nitro-2-iodo-2-(N-piperidino)-ethylene,
1-nitro-2-iodo-2-ethoxyethylene,
1-nitro-2-chloro-2-methoxyethylene,
1-nitro-2-iodo-4-methoxy-1-butene,
1-nitro-2-iodo-2-phenoxyethylene,
1-nitro-2-bromo-2-phenoxyethylene,
1-nitro-2-iodo-2-ethylthioethylene,
and the like.

The 1-nitro-2-halo-ethylenes that are used in the invention can be represented by formula I:

I  R—CX  CHNO$_2$ wherein X represents bromo, chloro, or iodo, and wherein R represents alkyl, aryl, tertiary amino, alkoxy, aryloxy, alkoxyalkylene, alkylthio, hetero-cycyl, and the like. R will normally contain not more than 18 carbon atoms, and preferably not more than six carbon atoms. In general, it is preferred that X be iodo and that R be an alkyl group bonded to the ethylene moiety through a tertiary carbon atom. Preferred particular R groups include alkyl of up to 6 carbon atoms, N, N-dialkylamino wherein the two alkyl groups contain up to a total of 12 carbon atoms, phenyl, N-morpholino, N-piperidino, and N-pyrrolidino.

The process of the invention is carried out by contacting the 1-nitro-2-haloethylene starting reactant with a strong base in a heterogeneous reaction system at a temperature and for a period of time sufficient to dehydrohalogenate the starting reactant and produce a nitroacetylene. By the term "heterogeneous reaction system" is meant a system wherein the strong base is in a different phase than the reactant and product. Preferably, the base is in the solid state and the reactant is in the vapor state. However, a system wherein the base is solid and the reactant is liquid can also be used. In such cases, the use of an inert liquid reaction medium in which the base is quite insoluble is preferred.

Among the bases that can be used are the alkali metal and alkaline earth metal hydroxides, alkoxides, hydrides, amides, and other strong bases. Specific illustrative examples include sodium hydroxide, potassium hydroxide, sodium methoxide, potassium ethoxide, calcium hydroxide, barium hydroxide, sodium hydride, sodium amide, potassium amide, lithium amide, calcium amide, and the like. Potassium hydroxide is preferred.

The reaction is best carried out by passing the 1-nitro-2-haloethylene starting reactant through a bed of the base. This can be done, for instance, by distilling the starting reactant under vacuum so that the vapors pass through a catalyst bed. The product can then be collected in a cold trap by conventional procedures. Alternatively, the starting reactant in the liquid state (preferably in solution in an inert solvent) can be passed through a column containing a bed of strong base. The effluent from the column is collected and is preferably cooled immediately. The product can be recovered by standard procedures such as by recrystallization, flash distillation of a solvent (under vacuum), and the like. In many cases, it is not necessary to recover the product in a pure state. Nitroacetylenes are so reactive that impure material can be immediately used in future reactions with little or no interference from any contaminants (such as unreacted starting material) that are likely to be present. The product from such further reactions can then be recovered in a pure state by conventional procedures.

Where an inert reaction medium is used, hydrocarbons are preferred. Examples of such hydrocarbons include pentane, hexane, cyclohexane, benzene, and others that can readily be removed from the product, if desired, by distillation.

In one very useful variation of the process of the invention, a mixture of a 1-nitro-2-haloethylene and a compound which is reactive with nitroacetylenes (such as a secondary amine) is contacted with a base. The nitroacetylene which is produced in situ then immediately reacts with the said compound. The reaction product of the nitroacetylene and said compound is then recovered.

The particular reaction temperature selected depends, in part, upon the phase of the starting reactant. When the starting reactant is in the vapor phase, the reaction temperature can be from about 60° C. to the melting point of the base (up to about 150° C.), and is preferably from about 80° to about 120° C. When the starting reactant is in the liquid phase, it is preferable to carry out the process in the cold, for instance, from about −20° to about +10° C.

The exact contact time with the base depends, in part, upon the phase of the starting reactant. For a vapor phase reaction, the contact time is usually of the order of from a small fraction of a second to about 30 seconds, and preferably from about 0.01 to about 5 seconds. For a liquid phase reaction, contact times will usually vary from a fraction of a minute to about 5 minutes, and preferably from about 0.01 to about 1 minute.

The nitroacetylenes of the invention can be represented by formula II:

II RC  CNO$_2$ wherein R has the significance stated above with respect to formula I.

Among the nitroacetylenes that are provided by the invention are the following compounds:
1-nitro-propyne-1,
1-nitro-butyne-1,
1-nitro-pentyne-1,
1-nitro-hexyne-1,
1-nitro-3,3--dimethylbutyne-1,
1-nitro-2-phenylacetylene,
1-nitro-2-(N,N-dimethylamino)acetylene,
1-nitro-2-(N-morpholino-acetylene,
1-nitro-2-(N-piperidino)acetylene,
1-nitro-2-methoxyacetylene,
1-nitro-2-ethoxyacetylene,
1-nitro-4-methoxybutyne-1,
1-nitro-2phenoxyacetylene,
1-nitro-2-methylthioacetylene,
1-nitro-2-ethylthioacetylene,
1-nitro-2-(4-pyridyl)acetylene,
and the like.

The nitroacetylenes of the invention are very useful compounds. They are powerful dienophiles, and can be reacted with dienes to give adducts which can be reduced to the corresponding primary amines of known utility. For instance, the reaction of cyclopentadiene with a nitroacetylene yields the following compound:

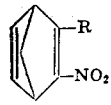

which can be reduced to yield:

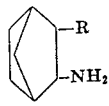

Primary amines per se have known utility. For instance, they can be reacted with drying oil acids to produce compounds useful in surface coatings applications, they can be used as co-hardeners for polyepoxide resins, and they can be used as molecular weight controllers in linear polymers prepared by reacting diisocyanates with diamines.

The nitroacetylenes of the invention can be reacted with secondary amines to form 1-nitro-2-(tertiary amino)-ethylenes, for instance:

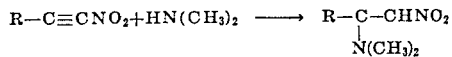

Such compounds can be reduced to the corresponding saturated amines:

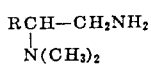

These saturated amines can be used as reactive catalysts in the production of urethane polymers and polyepoxide resins.

The nitroacetylenes are also useful as reaction intermediates. They can add to protic compounds such as alcohols, alcoholates, thiolates, primary and secondary amines, anions such as malonic ester and acetoacetic ester, nitro-alkanes, and the like. They can undergo electrophilic additions with hydrogen halides, and the like. They can undergo cycloadditions with compounds such as enamines, vinyl ethers, azides, diazoalkanes, isocyanates, dienes, and the like.

The examples below illustrate the invention (all temperatures are in Centigrade).

EXAMPLE I.

a. 3,3--Dimethyl-2-iodo-1-nitrobutylene (I)

A stirred solution of 28.1 g. (0.343 mole) of t-butylacetylene and 55 g. of iodine (0.55 mole)(as I) in 450 ml. abs. ether was cooled in an ice-bath, while 18.3 g. (0.4 mole of NO$_2$) of dinitrogen tetroxide (distilled over P$_2$O$_5$) was passed into the solution by a slow stream of dry nitrogen over a period of 7 hours.

The reaction system was equipped with a dry-ice-acetone condenser and a Ca Cl$_2$ drying tube.

The reaction mixture was allowed to warm up overnight, washed several times with small portions of concentrated aqueous sodium thiosulfate until the color of excess iodine had disappeared.

The solution was dried over sodium sulfate and after evaporation of the solvent, gave 40.35 g. of a yellow liquid (46.5 percent yield).

VPC showed it to be a mixture of two isomeric compounds.

After reprecipitation (two times) in n-pentane, and removal of the solvent, 30.6 g. of the less volatile compound were obtained pure (35.1 percent yield).

B.p.= ~ 75°/0.1 mm.

| Analysis | Calc. for C$_6$H$_{10}$INO$_2$ | | | |
|---|---|---|---|---|
| | C 29.38 | H 4.11 | N 5.71 | O 12.81 |
| Found | C 28.85 | H 4.11 | N 5.86 | O 13.06 |
| Molecular weight | | calc. 255, | | found 267 | b. 3,3--Dimethyl-1-nitro-butyne (II)
(t-butyl-nitroacetylene) (II)

A 30 cm. long tube with 1.5 cm. internal diameter (similar to a Liebig condenser) packed with solid KOH is heated to 100° C. by a circulating liquid.

Through this tube, similar to a "Kugelrohr" distillation, 5.0 g. of (I) is slowly distilled under vacuum (0.1 mm./Hg.), the elimination products are condensed by cooling with dry ice.

After about 5 hours the distillation is finished. The cooled flasks are then washed with n-pentane and dried by filtration through sodium sulfate. Removal of the solvent yields 2.3–2.35 g. (92–94 percent of a slightly green yellow, volatile and very lacrymatory liquid.

M.p.: −2.5°−3.5° (nearly colorless crystals).

B.p.: ±55°/15 mm. Hg.

| Analysis | Calc. for C$_6$H$_9$NO$_2$ | | | |
|---|---|---|---|---|
| | C 56.68 | H 7.14 | N 11.02 | O 25.17 |
| Found | C 57.19 | H 7.31 | N 11.14 | O 25.16 |

IR and NMR analyses confirm the structure.

EXAMPLE II.

Reactions of t-butyl nitroacetylene

General remarks: for the stability tests traces of catalytically active substances may change the given values considerably.

Stability at Room Temperature

Decomposition of pure (II) at room temperature occurs slowly. After 2–3 days (observation by VPC) 50 percent of the starting material had decomposed.

Stability at 60°

Observation of pure (II) in a 0.025 mm. IR cell heated to about 60° C. shows a decrease of the intense triple bond from 2.5 to 47 percent transmission within 5.5 hours. After half an hour 50 percent of the starting material has decomposed.

Stability at 80°–85° in Toluene

Decomposition of (II) in toluene at 80°–85° C. was followed by IR and VPC. After half an hour about 50 percent undecomposed (II) was observed, after 10 hours only a small percent of (II) were left.

Stability Towards Tertiary Organic Bases

Triethylamine (ca. 5 percent of II) added to a 3 percent solution of (II) in n-hexane after some days gives a dark-red oil which precipitates from the solution. VPC shows few volatile compounds, the rest is polymeric.

One drop of triethylamine, 1-pyrrolidino-cyclopentene, or methylamine added to one drop of (II) produces a violent reaction or even ignition.

Reaction With Piperidine (secondary amine)

Within 30 minutes, 170 mg. piperidine (2 mmole) in 2 ml. ether are added to an ethereal solution of 254 mg. (2 2 ml. ether at 0° C. The mixture becomes deep yellow. Fractionation yields 340 mg. of a yellow oil. B.p. 95°–96° (0.1 mm. Hg.); i.e. 80 percent yield. NMR and IR analyses confirm the structure of the adduct to be:

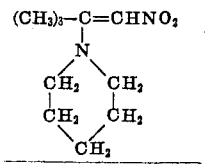

Reaction With Cyclopentadiene

To 254 mg. (II) (2 mmole) 2 ml. of cylopentadiene is added. After 2 hours, excess cyclopentadiene is removed by distillation. The residue is separated from dicyclopentadiene by preparative VPC. Yield: 220 mg. of a yellow oil (i.e. 57 percent ). B.p. 60°–65°/0.1 mm. Hg. NMR and IR confirm the structure:

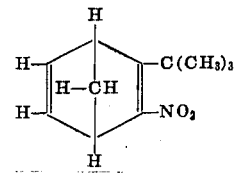

Dienophilic Activity of (II)

The dienophilic activity of (II) was compared with other t-butyl dienophiles as t-butyl-nitroethylene $(CH_3)_3C—CH=CH—NO_2$ (V) and t-butyl acetylene carboxylate $(CH_3)_3C—C\equiv C—COOEt$ (VI).

To 1 mmole of each dienophile, 1 ml. of cyclopentadiene was added; the proceeding of the reactions at room temperature was controlled by VPC.

Result: (II) had reacted completely within 1–½ hours while V and VI gave no adducts within a week.

What is claimed is:

1. Process for producing nitroacetylenes which consists of contacting under anhydrous conditions and at a temperature of from about 60° to about 150° C. (a) a vaporous 1-nitro-2-haloethylene of the formula: $RCX=CHNO_2$ wherein R is a member of the group consisting of alkyl or aryl of up to 18 carbon atoms and wherein X represents chloro, bromo, or iodo, with (b) a strong base, which is in the solid state and which is a member of the group consisting of alkali metal hydroxides, alkaline earth metal hydroxides, alkali metal alkoxides, alkaline earth metal alkoxides, alkali metal hydrides, alkali metal amides, and alkaline earth metal amides, and recovering said nitroacetylene.

2. The process of claim 1 wherein strong base is an alkali metal hydroxide.

3. The process of claim 1 wherein the alkali metal hydroxide is potassium hydroxide and wherein the 1-nitro-2-haloethylene is 3,3--dimethyl-1-nitro-2-iodobutylene

* * * * *